Figure 1:
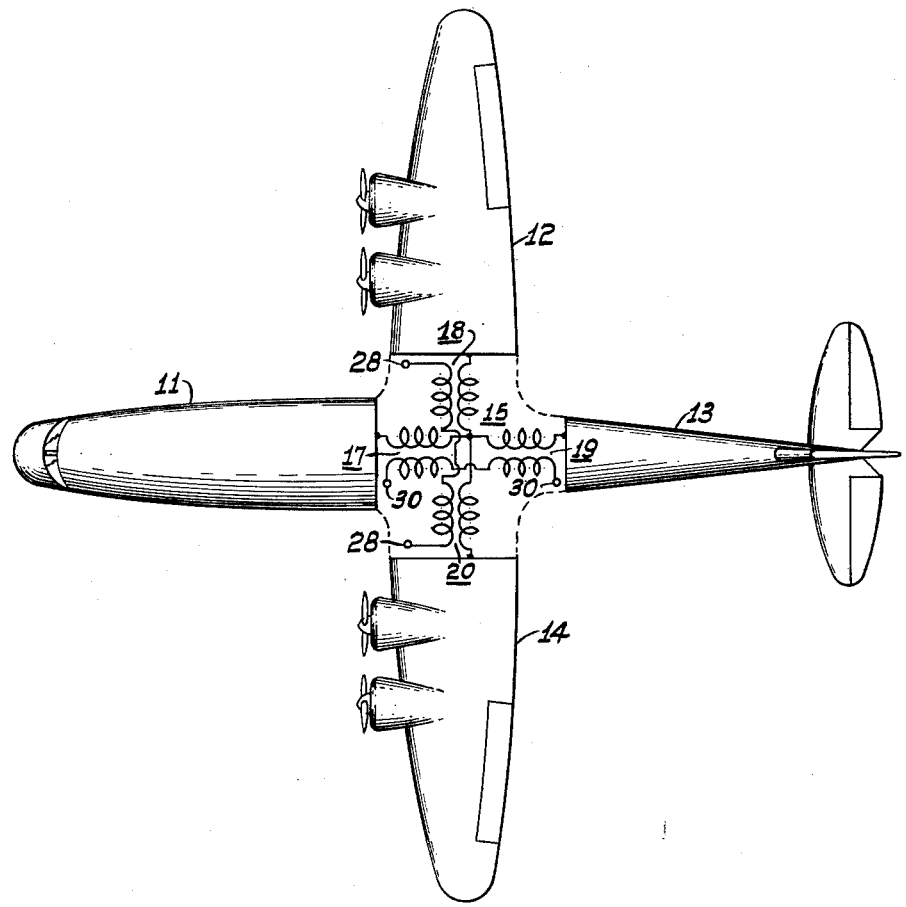

Nov. 18, 1952  D. G. C. LUCK  2,618,747
AIRCRAFT ANTENNA SYSTEM

Filed Feb. 15, 1949  2 SHEETS—SHEET 1

INVENTOR
David G. C. Luck
BY Harry Tunick
ATTORNEY

Nov. 18, 1952 — D. G. C. LUCK — 2,618,747
AIRCRAFT ANTENNA SYSTEM
Filed Feb. 15, 1949 — 2 SHEETS—SHEET 2
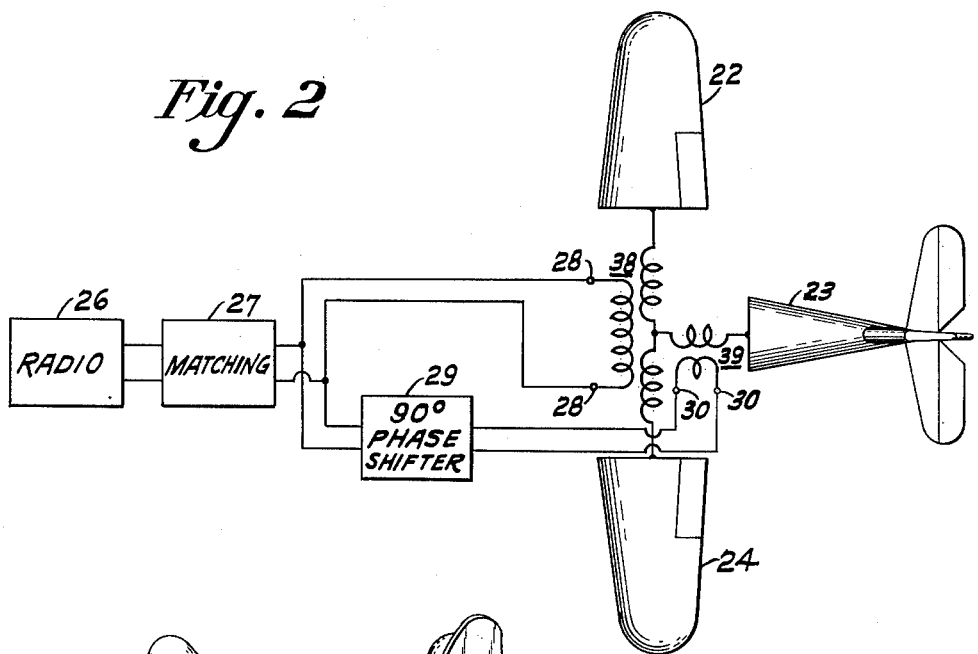
Fig. 2
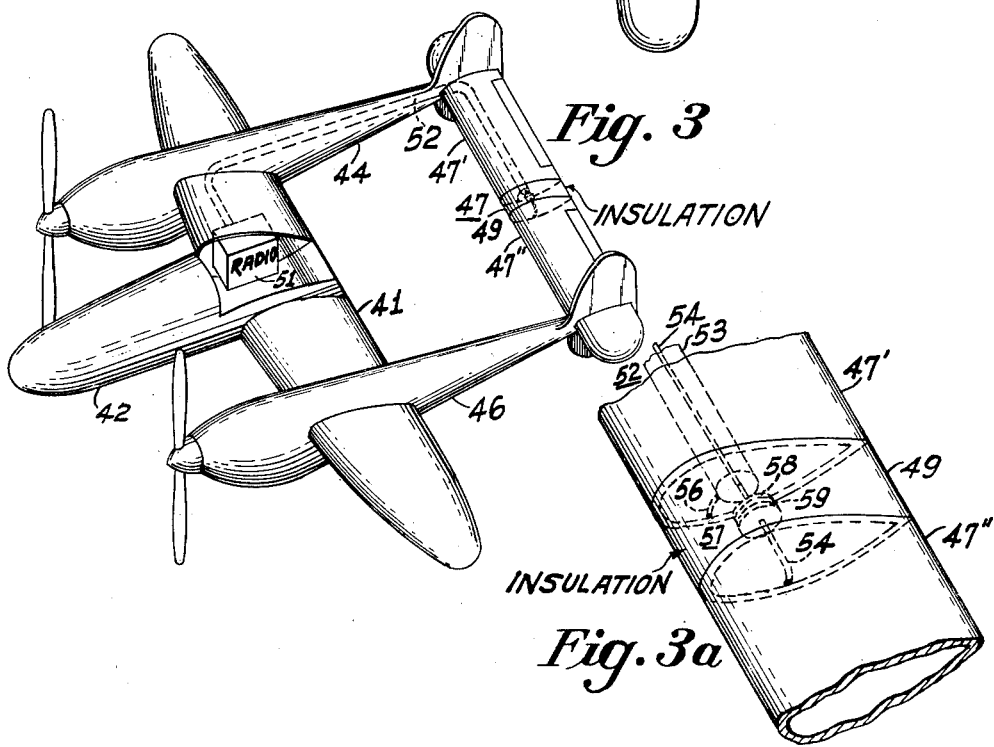
Fig. 3
Fig. 3a
INVENTOR
David G. C. Luck
BY Harry Tunick
ATTORNEY Patented Nov. 18, 1952

2,618,747

UNITED STATES PATENT OFFICE 2,618,747

AIRCRAFT ANTENNA SYSTEM

David George Croft Luck, Princeton, N. J., assignor to Radio Corporation of America, a corporation of Delaware Application February 15, 1949, Serial No. 76,572

10 Claims. (Cl. 250—33.67)

The invention relates to antennas, and it particularly pertains to novel aircraft antenna systems adapted for radio transmission and reception from metal clad airplanes.

There is a need for an aircraft antenna system for use at medium and high frequencies in order that communication may be reliably established from an airplane to another airplane or a ground station located beyond the line of sight. Such an antenna system must include a highly efficient radiator or receptor but must not adversely affect the aerodynamic operation of the aircraft.

Conventional antennas now employed in aircraft for transmission and reception of radio signals display many inherent mechanical disadvantages. Projecting into the air stream, they are disadvantageous from an aerodynamic standpoint because they increase the parasitic drag. They are also subject to weathering, to accumulation of ice, and to vibration tending toward fatigue failure, as well as being subject to severance through accidents, etc., which would render the radio system inoperative. In some instances the antenna installations of the prior art have been so located that they introduce serious requirements for ground service to the aircraft, such as difficulty in repairing and servicing or loading and unloading the aircraft.

A conventional single element antenna, in addition, displays many electric disadvantages. The frequency-response curve is relatively sharp, requiring the use of complex tuning expedients to permit transmission or reception of radio signals at frequencies other than the resonant frequency of the antenna. Such complex tuning expedients often absorb a large amount of the available power, in some instances up to 90 per cent thereof. Since the power available from aircraft transmitters is usually limited, on the order of 100 watts or less, any absorption would seriously reduce the power available for radiation and in turn reduce the effective range of the equipment.

A single wire antenna system presents a relatively low capacity system, and it is highly desirable that a high capacity, low impedance antenna system be available, as this will reduce the R. F. voltage required for a given R. F. power output.

It has been proposed to overcome the above mentioned disadvantages by insulating the wings, or at least the outermost portion thereof, from the remainder of the aircraft and employing the isolated outboard portions as antenna elements. This expedient has been carried out with good efficiency; however, such an antenna system does not have a uniform horizontal directive pattern, rendering the system ineffective in working with stations approximately in line with the wings.

Therefore, it is an object of the invention to provide an antenna system for a metal clad aircraft having a uniform horizontal directive pattern.

It is another object of the invention to provide an antenna system which is not any more subject to weathering or icing conditions than is the aircraft itself.

It is a further object of the invention to provide an antenna system which is not susceptible to air stream induced vibration.

It is still another object of the invention to provide an antenna system which may be an integral portion of the airplane.

It is a still further object to provide an antenna which does not appreciably weaken the aircraft structure with which it is integrally constructed.

It is a still further object of the invention to provide an antenna system which is not prone to accident, breakage, which does not require servicing or maintenance.

It is yet another object of the invention to provide a medium and high frequency antenna for aircraft in accordance with the foregoing objects of the invention.

It is still another and further object of the invention to provide an antenna system having a broad frequency response and which has a rate of change of impedance over a given band of frequencies less than that of the conventional single wire type antenna.

It it yet a further object of the invention to provide a metal clad aircraft with an antenna system which will not be in the way of operations incident to the aircraft when on the ground.

It is an additional object of the invention to provide an antenna system for metal clad aircraft which does not add aerodynamic drag to the aircraft.

These and other objects which will appear as the specification progresses are attained according to the invention with metal clad aircraft by interposing a discontinuity in one or more of the structural members of such an aircraft and connecting transducer apparatus across the discontinuity to convert the metal clad aircraft structure itself into an antenna.

More specifically, the objects of the invention are attained in single fuselage metal clad aircraft by isolating wing and fuselage portions and coupling them to transducer apparatus to form a single layer turnstile antenna, while twin fuselage or twin boom metal clad aircraft are converted into a single turn loop antenna by interposing a discontinuity in one part of the structure and coupling transducer apparatus across the discontinuity.

The invention will be described in connection with the accompanying drawing forming a part of the specification and in which:

Figs. 1 and 2 are illustrations of aircraft radio installations according to the invention for single fuselage metal clad aircraft, and Fig. 3 is an illustration of an aircraft radio installation according to the invention for use with twin fuselage or twin boom metal clad aircraft, Fig. 3a being an illustration of certain details of Fig. 3.

Referring to Fig. 1 there is shown an outline of a well-known all metal aircraft of the single fuselage type. This outline will be recognized as that of very large multi-engine planes which are ideal for the application of the invention for wavelengths equal to or greater than the wing spread.

By means of insulating sections integrally combined with the metal structure (not shown or described in detail as they form no part of the invention per se) the aircraft is divided into at least four sections, 11–14 shown in Fig. 1 by solid lines. While it is conceivable that the aircraft can be divided into four sections, it is anticipated that in all probability it will be more practicable to isolate the radiating portions from a central portion 15, shown by dashed lines, in which the transducer apparatus will be arranged although it should be understood that the transducer apparatus may be installed anywhere within the body of the aircraft. Sections 11–14 form the radiators of a turnstile antenna to provide a uniform radio frequency field in the plane of the aircraft. Radiators 11–14 are coupled to the transducer apparatus in any known manner whereby the radiators 11 and 13 are fed in phase quadrature to radiators 12 and 14. One method for carrying out this requirement makes use of secondary windings of transformers 17–20 having one terminal thereof connected to radiators 11–14 respectively and the other terminals connected in common. Radio frequency (R. F.) voltages differing in phase by 90° are applied to the primary windings of transformers 17 and 19 connected in series and 18 and 20, also connected in series. Further details of the method of obtaining the required R. F. voltages will be described with reference to Fig. 2 wherein there is shown a modification of the arrangement shown in Fig. 1.

The arrangement of Fig. 2 is specifically applicable to aircraft having a relatively short nose section such as is found in many airplanes, wherein it is anticipated that the structure will be most practically divided into three radiating sections 22–24 and a fourth section (not shown) comprising the cockpit and engine nacelle, the major portion of which lies between sections 22 and 24 and therefore is not suitable to serve as a radiating element. Sections 22—24 are excited as an unsymmetrical turnstile antenna in much the same fashion as the arrangement of Fig. 1. Here the radio apparatus 26 which may be a transmitter, a receiver or any other known radio frequency transducer, is coupled to an impedance matching network 27 of known type, the output terminals of which are connected directly to terminals 28 and via a 90° phase shifting network 29 to terminals 30 which terminals also correspond to the terminals of the same reference numerals in Fig. 1. Much as in the arrangement of Fig. 1 terminals 28 are connected to the primary winding of a transformer 38 having two secondary windings which are connected in series and have the terminals thereof connected to radiators 22 and 24 to excite the same in opposite sense in the well known manner for exciting turnstile antennas. Terminals 30 are connected to the primary winding of a transformer 39 having a single secondary winding connected between radiator 23 and the junction of the secondary windings of transformer 38. Comparing Figs. 1 and 2 it will be seen that the arrangements are effectively the same, the only distinction lying in the elimination of the fourth radiator and its transformer. In both cases the coupling transformers have ratios suited to the impedances of the radiators to which they are connected and which vary with the aircraft to which the invention is applied.

Thus it is seen that the metal clad aircraft is provided with an antenna system having a very broad pass band inherent in the impedance and phase relationships of the turnstile antenna and providing radiation substantially uniform in the horizontal plane whereby communications may be established readily with other aircraft in flight no matter in what direction they may be with respect to the aircraft under consideration. It is also an important feature of the arrangement according to the invention that relative changes in direction of the communicating aircraft do not affect the transmission in any way. The vertical directivity of the antenna is broad since the antenna is but a single layer turnstile.

The above described arrangements can be employed with most of the known aircraft to good advantage. It is contemplated that the invention can be applied if desired to other aircraft. For example, the planes having long nose sections can be made to operate as described in the embodiment illustrated in Fig. 2 by substituting the nose portion for the tail section of the embodiment of Fig. 2.

The principles of the invention can be applied to twin fuselage planes, an example of which is shown in Fig. 3, by judiciously choosing the sections to be insulated to serve as radiating elements. However, with this type of aircraft the basic principle of the invention is more conveniently realized in another manner, hereinafter described.

Referring to Fig. 3 there is shown an illustration of a twin-fuselage aircraft of the type having a central wing portion 41 at the center of which cockpit portion 42 is located and at the ends of which fuselage portions 44 and 46 are located. In some types of airplanes fuselage portions 44 and 46 are reduced to small cross sections to which type of aircraft the term twin-boom is more correctly applied. However, twin-boom aircraft such as the flying boats and rear-loading cargo planes not only will operate as efficiently but also make good use of an antenna according to the invention because of the larger amount of ground handling incident to these planes. At the aftermost ends of the craft and between portions 44 and 46, a stabilizer-elevator section 47 is arranged. According to the invention an insulating portion 49 is interposed in section 47 dividing it into sections 47' and 47" and transducer apparatus 51 is coupled by means of a transmission line 52 to the single turn loop antenna formed by sections 47', 44, 41, 46 and 47", the conductors of transmission line 52 being coupled across the discontinuity formed by portion 49. Preferably a coaxial transmission line comprising a sheath 53 and an inner conductor 54 is employed, permitting the sheath 54 to be bonded to the metal structure of the aircraft for its entire length if desired, although bonding the sheath to the structure is by no means necessary. While at least a part of transducer apparatus 51 will be installed in the cockpit section 42 it should be understood that it may be located in any part of the airplane convenient to the purpose for which it is intended.

The horizontal loop antenna formed according to the invention may be tuned by means of a reactance element coupled across the discontinuity. Any convenient reactor may be employed but it is especially anticipated that it be constituted by a section of coaxial transmission line. Such a section of transmission line may be cut to a length at which the loop antenna presents the proper reactance for the desired operating frequency or band of frequencies, the line being open or shorted as desired, but preferably an adjustable shorting plunger is arranged to be positioned axially along the line to enable a quick and easy adjustment to be made whenever desired. Due to the inherent electrical characteristics of most modern aircraft at the medium and high frequencies, a reactance element is preferably coupled across the discontinuity in series with the transducer equipment, capacitive reactance usually being desired. Referring to Fig. 3a there is shown a large scale detailed schematic view of the end portions of sections 47' and 47" and insulating section 49 together with a portion of transmission line 52. For clarity, the end portions of sections 47' and 47" and insulating section 49 are shown as hollow monocoque aerofoils, as the exact structural detail of the aircraft forms no part of the invention per se. The end of sheath 53 of transmission line 52 is connected by means of a short lead 56 to the edge section 47' and a capacitor 57 comprising two spaced parallel conductor plates 58 and 59 is interposed in center conductor 54, the end of which is bonded to the end of section 47". Capacitor 57 is shown more or less schematically as a pair of spaced metal discs, but it may be constructed in a number of different forms. A standard and readily available radio transmitting type capacitor may of course be used if found suitable, and it may prove advantageous to mold capacitor 57 directly into a solid insulating section 49. It is also suggested that two metal plates of proper area and spacing may be molded into an insulating member, one of the plates being arranged to make electrical connection to section 47" when it is installed and the other being provided with a lead fitting for connecting to center conductor 54. Preferably, however, it is contemplated that section 49 will contain a cavity in which a conductor 58 is mounted in fixed relationship to section 49 and provided with a fitting for ready connection to conductor 54 and a second conductor 59 is arranged to be moved with respect to conductor 58 by any convenient adjusting means, such as a threaded shaft for axial adjustment or a rotatable shaft for rotating adjustment, which adjusting means is adapted to form a connection to section 47" when installed. An opening is preferably provided in the structure of section 47" to provide access to the capacitor for this adjustment.

While the discontinuity provided by section 49 is preferably introduced in stabilizer 47 to minimize weakening of aircraft structure, it should be understood that be it desirable, the discontinuity may be introduced at any point on the loop convenient to the designer's purpose.

While the invention has been described in terms of express embodiments, it is to be understood that obvious modifications thereof will be suggested to those skilled in the art without departing from the spirit and scope of the invention.

What is claimed is:

1. An antenna system for twin-fuselage aircraft having a substantially all metal structure arranged in the form of a closed metallic loop constituted by the twin fuselages and associated conductive structure interconnecting the ends of said fuselages, comprising means to interpose a discontinuity in the structure forming said loop and means to couple radio transducer apparatus across said discontinuity.

2. An antenna system for twin-fuselage aircraft having a substantially all metal structure arranged in the form of a closed metallic loop constituted by the twin fuselages and associated conductive structure interconnecting the ends of said fuselages, comprising a discontinuity in the structure forming said loop and means to couple radio transducer apparatus across said discontinuity to convert said structure effectively into an antenna having a uniform directivity pattern in the plane of said loop.

3. An antenna system for twin-fuselage aircraft having a substantially all metal structure arranged in the form of a closed metallic loop defined by the twin fuselages and associated conductive structure interconnecting the ends of said fuselages, comprising means to interpose a discontinuity in the structure forming said loop and means to couple radio transducer apparatus across said discontinuity, said means comprising a series reactance.

4. An antenna system for twin-fuselage aircraft having a substantially all metal structure arranged in the form of a closed metallic loop defined by the twin fuselages and associated conductive structure interconnecting the ends of said fuselages, comprising means to interpose a discontinuity in the structure defining said loop and means to couple radio transducer apparatus across said discontinuity, said means comprising a coaxial transmission line having a sheath and a center conductor and a capacitor interposed in said center conductor.

5. An antenna system for twin-fuselage aircraft having a substantially all metal structure arranged in the form of a closed metallic loop defined by the twin fuselages and associated conductive structure interconnecting the ends of said fuselages, comprising a discontinuity in the structure defining said loop, a coaxial transmission line having a conductor and a sheath surrounding said conductor, said sheath being connected to said structure at one edge of said discontinuity, and a variable capacitor having one terminal thereof connected to said structure at the opposite edge of said discontinuity and the other terminal connected to said conductor of said transmission line.

6. An antenna system for aircraft of the type having twin fuselage members and further structural members arranged to define a closed conductive loop, means to interpose a discontinuity in said loop, and means to couple radio transducer apparatus across said discontinuity.

7. An antenna system for aircraft of the type having twin fuselage members and further structural members arranged to define a closed conductive loop, means to interpose a discontinuity in said loop, means to couple radio transducer apparatus across said discontinuity, and a reactive component interposed in series with the last-said means.

8. An antenna system for aircraft of the type having twin fuselage members and further structural members arranged to define a closed conductive loop, means to interpose a discontinuity in said loop, and means to couple a radio frequency transmission line having a reactive component across said discontinuity.

9. In a substantially all-metal twin fuselage aircraft having structural elements arranged between ends of the twin fuselages to form a closed conductive loop, means to provide an antenna system operative therewith comprising a section of insulation interposed in one of said structural elements and means to couple radio transducer apparatus to said one structural element across said section of insulation.

10. In a substantially all-metal twin fuselage aircraft having wing and tail structural elements arranged between ends of the twin fuselages to form a closed conductive loop, means to provide an antenna system operative therewith comprising a section of insulation interposed in said structural tail element and means to couple radio transducer apparatus to said structural tail element across said section of insulation.

DAVID GEORGE CROFT LUCK.

REFERENCES CITED

The following references are of record in the file of this patent:

UNITED STATES PATENTS

| Number | Name | Date |
| --- | --- | --- |
| 1,912,234 | Willoughby | May 30, 1933 |
| 2,008,522 | Taylor | July 16, 1935 |
| 2,044,779 | Hanson | June 23, 1936 |
| 2,129,852 | Leib | Sept. 13, 1938 |
| 2,235,139 | Bruce | Mar. 18, 1941 |
| 2,279,130 | Bruce | Apr. 7, 1942 |
| 2,404,093 | Roberts | July 16, 1946 |
| 2,510,698 | Johnson | June 6, 1950 |
| 2,518,843 | Wehner | Aug. 15, 1950 |